(12) United States Patent
Simada et al.

(10) Patent No.: US 6,980,446 B2
(45) Date of Patent: Dec. 27, 2005

(54) CIRCUIT FOR STARTING POWER SOURCE APPARATUS

(75) Inventors: Masaaki Simada, Saitama (JP); Tomoyasu Yamada, Saitama (JP)

(73) Assignee: Sanken Electric Co., Ltd., Saitama (JP)

(*) Notice: Subject to any disclaimer, the term of this patent is extended or adjusted under 35 U.S.C. 154(b) by 0 days.

(21) Appl. No.: 10/503,958

(22) PCT Filed: Feb. 10, 2003

(86) PCT No.: PCT/JP03/01378
§ 371 (c)(1),
(2), (4) Date: Aug. 6, 2004

(87) PCT Pub. No.: WO03/067744
PCT Pub. Date: Aug. 14, 2003

(65) Prior Publication Data
US 2005/0088862 A1 Apr. 28, 2005

(30) Foreign Application Priority Data
Feb. 8, 2002 (JP) ............................ 2002-031691

(51) Int. Cl.[7] ............................................. H02M 7/517
(52) U.S. Cl. ........................ 363/49; 363/21.16; 363/89
(58) Field of Search ............................ 363/21.08, 21.16, 363/49, 89

(56) References Cited

U.S. PATENT DOCUMENTS

| | | | | | |
|---|---|---|---|---|---|
| 4,595,873 A | * | 6/1986 | Musil | ............................ | 323/222 |
| 5,457,622 A | * | 10/1995 | Arakawa | ........................ | 363/59 |
| 5,886,885 A | * | 3/1999 | Fujie | .............................. | 363/49 |
| 5,909,361 A | * | 6/1999 | Kim | ........................... | 363/21.16 |
| 6,246,596 B1 | | 6/2001 | Yamazaki | | |

FOREIGN PATENT DOCUMENTS

| | | |
|---|---|---|
| JP | 04-141711 | 5/1992 |
| JP | 06-121535 | 4/1994 |

\* cited by examiner

*Primary Examiner*—Jeffrey Sterrett
(74) *Attorney, Agent, or Firm*—Townsend and Townsend and Crew

(57) ABSTRACT

When an AC power source (1) is turned on, energy is accumulated in a backup capacitor (63) by an energy supply circuit (64). An internal power source (65) supplies the energy accumulated in the capacitor (63) to a control unit (49). Thus, a power factor improvement circuit (40-2) operates. When the power factor improvement circuit (40-2) operates to output a predetermined voltage, an output voltage detection circuit (67) detects the voltage, and switches the turned on internal power source (66) on. The turned on internal power source (66) supplies the energy in the capacitor (63) to a control unit (56) to operate a DC/DC conversion circuit (50). In this way, by operating the DC/DC conversion circuit (50) after operating the power factor improvement circuit (40-2), the capacity of the capacitor (63) can be reduced.

17 Claims, 7 Drawing Sheets

CIRCUIT FOR STARTING POWER SOURCE APPARATUS

TECHNICAL FIELD

The present invention relates to a power source apparatus starting method, a starting circuit of a power source apparatus, and a power source apparatus.

BACKGROUND ART

To deal with the Harmonic Current Regulation (IEC610003-2) and the Appliance/commodity harmonic current suppressing guideline, a switching power source apparatus that has a power factor improving function is included in an AC adapter, an office automation equipment, or various commercial-devices. Concerning these AC adapters, office automation equipments, and various commercial-devices, also, miniaturization, lower costs, and saving of energy is desired. These kinds of switching power source apparatuses are disclosed in for example the below documents.

Document 1: Examined Japanese Patent Application KOKOKU Publication No. H7-57095

Document 2: Unexamined Japanese Patent Application KOKAI Publication No. H6-121535

In Examined Japanese Patent Application KOKOKU Publication No. H7-57095, a drive power source winding is provided in a transformer of a DC/DC converter, for deleting the constant-voltage circuit added to the drive power source, by stabilizing the drive voltage of the control circuit of the power factor improvement circuit, without receiving effect of the load. In the art of Examined Japanese Patent Application KOKOKU Publication No. H7-57095, the DC voltage generated by rectifying and smoothing the output voltage of the drive power source winding, is applied to a voltage dividing point of the voltage resistance provided in between the DC inputs, to generate drive voltages of the power factor improvement circuit and the DC/DC conversion circuit.

In Unexamined Japanese Patent Application KOKAI Publication No. H6-121535, a starting circuit that supplies drive power to both the DC/DC conversion control circuit and the power factor improvement circuit control circuit by a winding wounded around the transformer of the DC/DC converter, starts operation of the DC/DC converter when the power factor improvement circuit starts, and starts operation of the power factor improvement circuit thereafter.

The present invention proposes a power-saving starting method, a starting circuit, and an apparatus that accurately starts, from another aspect than the art disclosed in the above documents.

FIG. 7 is an example of a structural diagram of an outline of a conventional switching device and a starting circuit thereof.

This switching power source apparatus comprises a rectifier circuit 2 that full-wave rectifies the voltage from an AC power source 1, a power factor improvement circuit 10 that constitutes an AC/DC conversion circuit together with the rectifier circuit 2, and a DC/DC conversion circuit 20 that is connected to the output side of the power factor improvement circuit 10, and control units 19 and 29 that control the switching of the power factor improvement circuit 10 and the DC/DC conversion circuit 20.

The starting circuit of the switching power source apparatus comprises a backup capacitor 31 and an energy supply circuit 32 that are built into the DC/DC conversion circuit 20. The energy supply circuit 32 comprises a dividing voltage resistances that collects energy supplied from the power source 1, and generates drive voltage of the control units 19 and 29 with that energy.

Next, operation of the starting circuit and switching power source apparatus shown in FIG. 7 will be described.

FIGS. 8A to 8F are timing charts for describing operation of the switching power source apparatus.

When the AC power source 1 (FIG. 8(A)) is applied at a time t0, the rectifier circuit 2 starts total-wave rectifying of the AC voltage, and outputs the rectified rectifier voltage to a coil 12 in the power factor improvement circuit 10. The diode 14 whose anode is connected to the coil 12, and the capacitor that is connected to the cathode of the diode 14, carries out rectifying and smoothing of the rectifier voltage. At the point that the AC power source 1 is applied, an energy supply circuit 32 functions to pass a current from the capacitor 16, and charges the backup capacitor 31.

By the charging current of the energy supply circuit 32, energy is accumulated in the backup capacitor 31, and charge voltage rises (FIG. 8(B)). When the charge voltage of the backup capacitor 31 becomes equal to or higher than a predetermined voltage, the control units 19 and 29 activate with the energy accumulated in the backup capacitor 31, and turn on at a time t1 (FIGS. 8(C), 8 (E)).

On the other hand, resistances 11a and 11b, in the power factor improvement circuit 10, that is connected serially in between the anode terminal and the cathode terminal of the rectifier circuit 2, divide the rectifier voltage to generate a voltage signal. The resistances 17a and 17b that are serially connected in between two electrodes of the capacitor 16, divide the charging voltage of the capacitor 16 to generate a voltage signal. The coil 18 that electromagnetically couples with the coil 12, generates a voltage signal when energy is emitted from the coil 12. The NMOSS transistor 13 whose drain is connected to the coil 12, passes a current that passes through the coil 12, when it is an on state, to the cathode terminal of the rectifier circuit 2, and the resistance 15 that is connected to the source of the NMOS transistor 13 generates a voltage signal that is proportional to that current. The voltage signals are supplied to the control unit 19.

The control unit 19 that turns on with the supplied energy, generates a control signal based on the voltage signal supplied from the power factor improvement circuit 10, and supplies the control signal to the gate of the NMOS transistor 13, to control on/off of the NMOS transistor 13. By turning the NMOS transistor 13 on, current is passed through, in the order of, coil 12, NMOS transistor 13, resistance 15, to the cathode terminal of the rectifier circuit 2, from the anode terminal of the rectifier circuit 2, and energy is accumulated in the coil 12. When the NMOS transistor 13 is turned off, the energy accumulated in the coil 12 and the energy output from the rectifier circuit 2 passes via the diode 14, and the capacitor 16 is charged. The NMOS transistor 13 is repeatedly turned on and off. The charging voltage of the capacitor 16 becomes a predetermined voltage raised from the output voltage of the rectifier circuit 2 (FIG. 8(D)). By the NMOS transistor 13 repeatedly being turned on and off, the current that intermittently flows through the coil 12 is controlled so that it matches with the phase of the rectifier voltage that the rectifier circuit 2 generates. Namely, power factor improving operation is carried out.

On the other hand, the output voltage detection circuit 25 in the DC/DC conversion circuit 20 supplies a voltage signal that indicates charging voltage of the capacitor 24, to the control unit 29. The control unit 29 that is turned on, by being supplied energy, repeatedly turns the NMOS transistor 22 on and off, so that the charging voltage of the capacitor 24 becomes a predetermined value, based on the voltage signal supplied from the output voltage detection circuit 25.

When the NMOS transistor 22 is turned on, a current from the capacitor 16 flows through the primary winding 21a of a transformer 21, and energy is accumulated in the primary winding 21a. When the NMOS transistor 22 is turned off, flyback energy that corresponds to the energy of the primary winding generates in the transformer 21 of a second winding 21b, and is charged to the capacitor 24 via the diode 23 (FIG. 8(F)).

When the NMOS transistor 22 is turned off, flyback energy also generates in the auxiliary winding 26, which electromagnetically couples with the primary winding 21a. The flyback energy is charged to the backup capacitor 31 via the diode 27. Therefore, energy supplied to the control units 19 and 29 do not exhaust.

In this way, after the power source 1 is applied, the backup capacitor 31 is charged by the energy supply circuit 32, and the operation of the control units 19 and 29 are started by the energy charged to the backup capacitor 31, so as to operate the power factor improvement circuit 10 and DC/DC conversion circuit 20, to supply a requested DC voltage to the load 70.

However, there are problems such as below, in the starting method and starting circuit of the conventional switching power source.

The control unit 19 and 20 are activated at the same time by the energy charged in the backup capacitor 31 operate. Therefore, because the backup capacitor 31 needs to supply energy that drives two control units 19 and 29, a large capacity is necessary, and the size of the backup capacitor 31 grew. This hinders miniaturization and low cost of starting circuits, and switching power source apparatuses that have them built in.

Also, because the capacity of the backup capacitor 31 is large, the time needed to start the operation of the controls units 19 and 29 become longer. To solve this, if charging current that the energy supply circuit 32 passes through to the backup capacitor 31 is increased, there is a problem that the energy supply circuit 32 generates heat.

Further, another significant problem is that by the variation in starting voltage of the control units 19 and 29, starting deficiency in that the operation of one control unit starts, but the other does not, and the output voltage of the power factor improvement circuit 10 or the DC/DC conversion circuit 20 dropping by the power being taken up by the control unit that starts first, occurring by the starting time of the control units not matching.

Namely, it can not be determined which of the power factor improvement circuit 10 and the DC/DC conversion circuit 20 will start first, and even if they started at the same time, as shown in FIG. 8(D), rising of the power factor improvement circuit 10 is slow compared to the DC/DC conversion circuit 20. If the DC/DC conversion circuit 20 rapidly rises and flows a large current, before the output voltage of the power factor improvement circuit 10 becomes an adequate voltage, the output voltage of the power factor improvement circuit 10 further drops. As a result, the input voltage of the DC/DC conversion circuit 20 is not sufficient, and adequate energy can not be supplied to the output side. This leads to rising of the output voltage becoming longer, intermittent operation generating by the input voltage reducing, and rising time of the output voltage further becoming longer, and rising of the auxiliary power source built into the DC/DC conversion circuit 20 becoming late. To solve this, it is necessary to pass a large current to the dividing voltage resistance for starting, and make the capacity of the backup capacitor 31 built in the DC/DC conversion circuit 20 larger.

The Unexamined Japanese Patent Application KOKAI Publication No. H6-121535 discloses a method for driving the DC/DC conversion circuit 20 first, and has the same problem, because it is started in a state where the input voltage of the DC/DC conversion circuit 20 is low.

The object of the present invention is to provide a power saving, method for starting an apparatus, a starting circuit of a power source apparatus or a power source apparatus, which starts accurately and rapidly, and can miniaturize the capacity of the backup capacitor.

DISCLOSURE OF INVENTION

To solve the above problems, a method for starting a power source apparatus, according to a first aspect of the present invention, comprises an AC/DC conversion circuit that converts an AC voltage provided by a power source to a first DC voltage while operating, and a DC/DC conversion circuit that converts the first DC voltage that the AC/DC conversion circuit outputs, to a second DC voltage, while operating, by using an element to be charged for backup and an energy supply circuit that supplies the energy that the power source generates to the element to be charged, characterized by carrying out:

an initial charging processing that charges by supplying energy that the power source generates to the element to be charged, using the energy supply circuit from the time that the power source is applied;

a first starting processing that starts the AC/DC conversion circuit to operate by supplying the energy accumulated in the element to be charged to the AC/DC conversion circuit, in a case where it is detected that a predetermined energy is charged to the element to be charged;

an output voltage detection processing that detects that the first DC voltage is output, by the AC/DC conversion circuit operating, and a second starting processing that starts the DC/DC conversion circuit to operate by supplying the energy accumulated in the element to be charged to the DC/DC conversion circuit, after it is detected that the AC/DC conversion circuit output the first DC voltage.

The method for starting a power source apparatus may further carry out a stopping charge processing that stops the initial charging processing, after it is detected that the AC/DC conversion circuit output the first DC voltage. In this case, the element to be charged may be charged by supplying a part of the energy that the DC/DC conversion circuit generates to the element to be charged, after the stopping charge processing.

In a case where the AC/DC conversion circuit comprises:

a rectifier circuit that is connected to the power source;

a first coil that is connected to the rectifier circuit;

a first switching element that is connected to the first coil, which passes a current to the first coil when it is turned on, and stops the current when it is turned off;

first DC conversion means that transform the energy accumulated in the first coil to the first DC voltage, by the current passing through the first coil, and a first control unit that controls on/off of the first switching element, in the first starting processing, the AC/DC conversion circuit may be started by supplying the energy charged in the element to be charged to the first control unit and starting the first control unit.

In a case where the DC/DC conversion circuit comprises:

a second coil that is connected to the output terminal of the AC/DC conversion circuit;

a second switching element that is connected to the second coil, which passes a current to the second coil when it is turned on, and stops the current when it is turned off;

second DC conversion means that transform the energy accumulated in the second, coil to the second DC voltage, by the current passing through the second coil, and a second control unit that controls on/off of the second switching element, in the second starting processing, the DC/DC conversion circuit may be started by supplying the energy charged in the element to be charged to the second control unit and starting the second control unit.

To achieve the above object, a starting circuit of a power source apparatus, according to a second aspect of the present invention, is characterized by including an AC/DC conversion circuit that converts an AC voltage provided by a power source to a first DC voltage while operating, and a DC/DC conversion circuit that converts the first DC voltage that the AC/DC conversion circuit outputs, to a second DC voltage, while operating, and comprises:

an element to be charged for backup;

an energy supply circuit that charges the element to be charged by supplying energy that the power source generates, after the power source is applied;

a first internal power source that detects whether a predetermined energy has been charged to the element to be charged, and operates the AC/DC conversion circuit by supplying the energy accumulated in the element to be charged to the AC/DC conversion circuit;

an output voltage detection circuit that detects that the AC/DC conversion circuit is operating, and the first DC voltage is output, and a second internal power source that operates the DC/DC conversion circuit by supplying energy accumulated in the element to be charged to the DC/DC conversion circuit, after it is detected that the AC/DC conversion circuit is operating, and has output the first DC voltage.

The starting circuit of the power source apparatus, may further comprise stopping charge means for stopping charging to the element to be charged by the energy supply circuit, after it is detected that the AC/DC conversion circuit has output the first DC voltage. In this case, the starting circuit of the power source apparatus may further comprise charging continuation means for charging, by supplying a part of energy that the DC/DC conversion circuit generates to the element to be charged, after the stopping charge means stops charging to the element to be charged.

The AC/DC conversion circuit may comprise:

a rectifier circuit that is connected to the power source;

a first coil that is connected to the rectifier circuit;

a first switching element that is connected to the first coil, which passes a current to the first coil when it is turned on, and stops the current when it is turned off;

first DC conversion means that transform the energy accumulated in the first coil to the first DC voltage, by the current passing through the first coil, and a first control unit that controls on/off of the first switching element, and the first internal power source may start the AC/DC conversion circuit by supplying the energy accumulated in the element to be charged to the first control unit and starting the first control unit.

The DC/DC conversion circuit may comprise:

a second coil that is connected to the output terminal of the AC/DC conversion circuit;

a second switching element that is connected to the second coil, which passes a current to the second coil when it is turned on, and stops the current when it is turned off;

second DC conversion means that transform the energy accumulated in the second coil to the second DC voltage, by the current passing through the second coil, and a second control unit that controls on/off of the second switching element, and in the second internal power source, the DC/DC conversion circuit may be started by supplying the energy charged in the element to be charged to the second control unit and starting the second control unit.

The starting circuit of the power source apparatus may comprise an auxiliary coil that electromagnetically couples with the second coil, and a diode that charges the element to be charged by rectifying the energy that the auxiliary coil generates and supplying the energy to the element to be charged.

To achieve the above object, a power source apparatus according to a third aspect of the present invention, comprises:

an AC/DC conversion circuit that converts an AC voltage provided by a power source to a first DC voltage while operating;

a DC/DC conversion circuit that converts the first DC voltage that the AC/DC conversion circuit outputs, to a second DC voltage, while operating;

an element to be charged for backup;

an energy supply circuit that charges the element to be charged by supplying energy that a power source generates, after the power source is applied;

a first internal power source that detects whether a predetermined energy has been charged to the element to be charged, and operates the AC/DC conversion circuit by supplying the energy accumulated in the element to be charged to the AC/DC conversion circuit;

an output voltage detection circuit that detects that the AC/DC conversion circuit is operating, and the first DC voltage is output, and a second internal power source that operates the DC/DC conversion circuit by supplying energy accumulated in the element to be charged to the DC/DC conversion circuit, after it is detected that the AC/DC conversion circuit has output the first DC voltage.

The power source apparatus may further comprise stopping charge means for stopping charging to the element to be charged by the energy supply circuit, after it is detected that the AC/DC conversion circuit output the first DC voltage. In this case, the power source apparatus may further comprise charging continuation means for charging by supplying a part of energy that the DC/DC conversion circuit generates to the element to be charged, after the stopping charge means stops charging to the element to be charged.

The AC/DC conversion circuit may comprise:

a rectifier circuit that is connected to the power source;

a first coil that is connected to the rectifier circuit;

a first switching element that is connected to the first coil, which passes a current to the first coil when it is turned on, and stops the current when it is turned off;

first DC conversion means that transform the energy accumulated in the first coil to the first DC voltage, by the current passing through the first coil, and a first control unit that controls on/off of the first switching element, and the first internal power source may start the AC/DC conversion circuit by supplying the energy accumulated in the element to be charged to the first control unit and starting the first control unit.

The DC/DC conversion circuit may comprise:

a second coil that is connected to the output terminal of the AC/DC conversion circuit;

a second switching element that is connected to the second coil, which passes a current to the second coil when it is turned on, and stops the current when it is turned off;

second DC conversion means that transform the energy accumulated in the second coil to the second DC voltage, by the current passing through the second coil, and a second control unit that controls on/off of the second switching element, and in the second internal power source, the DC/DC conversion circuit may be started by supplying the energy charged in the element to be charged to the second control unit and starting the second control unit.

The power source apparatus may comprise an auxiliary coil that electromagnetically couples with the second coil, and a diode that charges the element to be charged by rectifying the energy that the auxiliary coil generates and supplying the energy to the element to be charged.

BEST MODE FOR CARRYING OUT THE INVENTION

Figure 1:
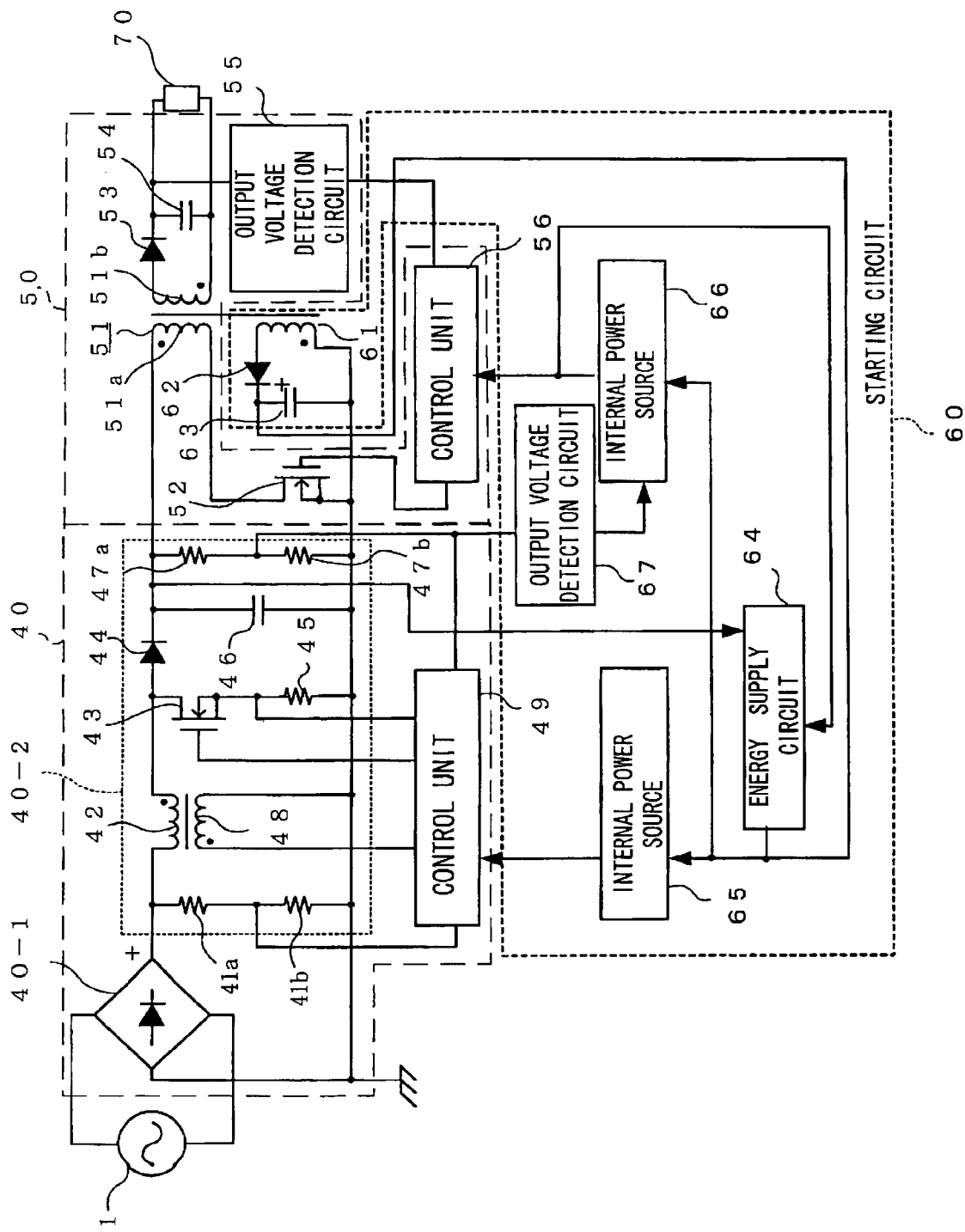
FIG. 1 is a diagram showing a structure example of a starting circuit and a switching power source apparatus, according to an embodiment of the present invention.

FIG. 1 is a structural diagram showing a starting circuit and a switching power source apparatus according to an embodiment of the present invention.

The switching power source apparatus comprises an AC/DC conversion circuit 40 that is connected to an AC power source 1, a DC/DC conversion circuit 50 that is connected to the AC/DC conversion circuit 40, and a starting circuit 60 that starts the operation of the AC/DC conversion circuit 40 and the DC/DC conversion circuit 50. The AC/DC conversion circuit 40 comprises a rectifier circuit 40-1 that is connected to the AC power source 1, and a power factor improvement circuit 40-2. A first control unit 49 that controls switching operation of the power factor improvement circuit 40-2 is provided in the power factor improvement circuit 40-2, and a second control unit 56 that controls switching operation of the DC/DC conversion circuit 50 is provided in the DC/DC conversion circuit 50.

The starting circuit 60 of the switching power source apparatus is constituted by an auxiliary coil 61, a diode 62, a backup capacitor 63 that is an element to be charged, an energy supply circuit 64, a first internal power source 65, a second internal power source 66, and an output voltage detection circuit 67.

Other than the control unit 49, the power factor improvement circuit 40-2 comprises voltage dividing resistances 41a and 41b that are connected serially in between the anode terminal and the cathode terminal, and a first coil 42 whose one end is connected to the anode terminal of the rectifier circuit 40-1. The cathode terminal of the rectifier circuit 40-1 is connected to a ground. The connection point of the resistance 41a and 41b is connected to the control unit 49.

A drain of an N-channel MOS transistor (hereinafter referred to as NMOS transistor) 43 which is a switching element, and an anode of a diode 44 are connected to the other end of the coil 42. A resistance 45 is connected in between the source of the NMOS transistor 43 and the cathode terminal of the rectifier circuit 40-1. The resistance 45 generates a voltage signal that corresponds to the current that runs through the NMOS transistor 43. The connection point of the resistance 45 and the source of the NMOS transistor 43 is connected to the control unit 49.

The cathode of the diode 44 is connected by one electrode of a capacitor 46. The diode 44 and the capacitor 46 become a first DC converting means and DC voltage output by the power factor improvement circuit 40-2 is charged to the capacitor 46. The other electrode of the capacitor 46 is connected to the cathode terminal of the rectifier circuit 40-1. In between the two electrodes of the capacitor 46, serial voltage dividing resistances 47a and 47b are connected. The connection point of the resistance 47a and 47b is connected to the control unit 49 and the output voltage detection circuit 67.

One end of the coil 48 is further connected to the cathode terminal of the rectifier circuit 40-1. The coil 48 electromagnetically couples with the coil 42 via a core, and the other end of the coil 48 is connected to the control unit 49.

The DC/DC conversion circuit 50 placed at the output side of the power factor improvement circuit 40-2, comprises a transformer 51 (hereinafter referred to as transducer). One end of a primary winding 51a of the transducer 51 is connected to one electrode of the capacitor 46 of the power factor improvement circuit 40-2, as a second coil. The drain of the NMOS transistor 52 is connected to the other end of the primary winding 51a. The source of an NMOS transistor 52 is connected to the other electrode of the capacitor 46.

One end of a secondary winding 51b of the transducer 51 is connected to the anode of the diode 53. The cathode of the diode 53 is connected to one electrode of a capacitor 54. The other electrode of the capacitor 54 is connected to the other end of the secondary winding 51b. The secondary winding 51b, the diode 53, and the capacitor 54 are second DC converting means that generate DC voltage that the DC/DC conversion circuit 50 outputs, and the capacitor 54 charges the DC voltage. While one electrode of the capacitor 54 is connected to an output voltage detection circuit 55, a load 70 is connected in between the two electrodes of the capacitor 54.

The auxiliary coil 61 of the starting circuit is electromagnetically coupled with the primary winding 51a of the transformer 51 of the DC/DC conversion circuit 50, via the core. One end of the coil 61 is connected to the other electrode of the capacitor 46, and the other end of the coil 61 is connected to the anode of the diode 62. The cathode of the diode 62 is connected to the anode electrode of the backup capacitor 63. The cathode electrode of the backup capacitor 63 is connected to the other electrode of the capacitor 46.

The connection point of the anode electrode of the backup capacitor 63 and the cathode of the diode 62 is connected to an internal power source 65 and an internal power source 66 of the starting circuit 60.

Figure 2:
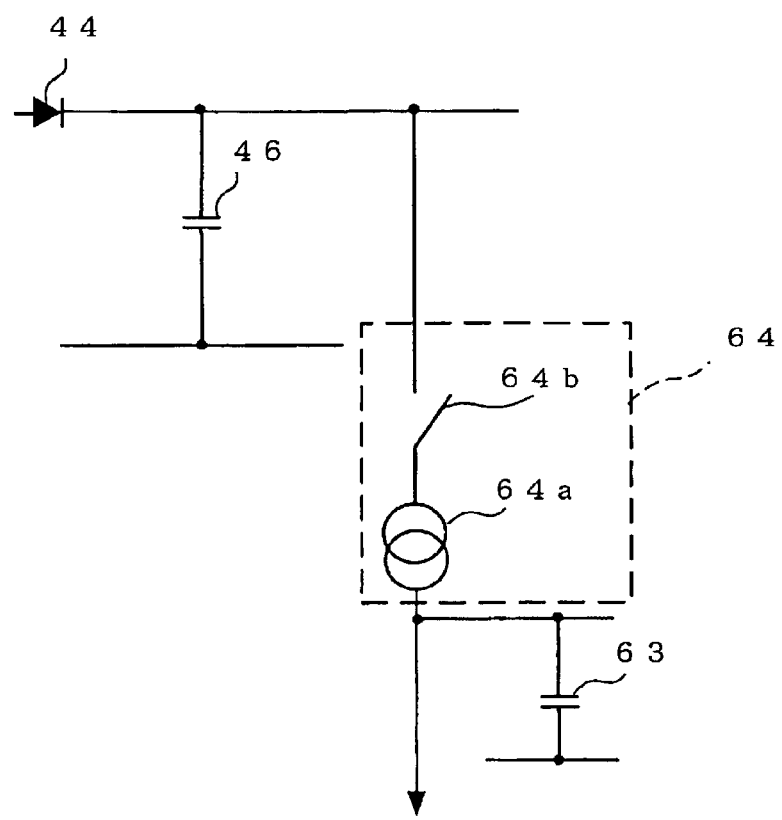
FIG. 2 is a diagram showing a structure example of an energy supply circuit in FIG. 1.

FIG. 2 is a diagram showing a structure example of the energy supply circuit in FIG. 1.

The energy supply circuit 64 charges the backup capacitor 63 by supplying energy, and comprises a constant current source 64a and a switch 64b. The switch 64b is connected in between the connection point between one electrode of the capacitor 46 in the power factor improvement circuit 40-2 and the cathode of the diode 44, and the constant current source 64a. An output terminal of the constant current source 64a is connected to the anode electrode of the backup capacitor 63. The switch 64b can be constituted by a field-effect transistor such as an NMOS transistor, etc., or a bipolar transistor. The constant power source 64a can also be constituted by a field-effect transistor such as an NMOS transistor, etc., or a bipolar transistor.

Figure 3:
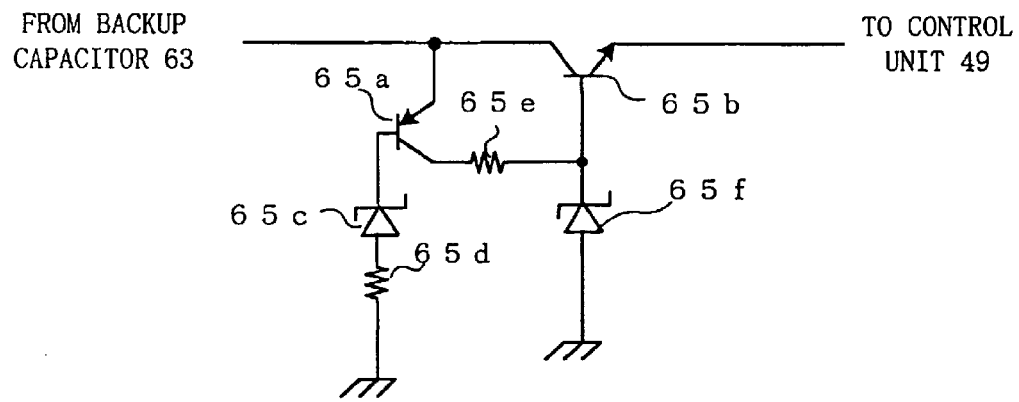
FIG. 3 is a diagram showing a structure example of an internal power source in FIG. 1.

FIG. 3 is a diagram showing a structure example of the internal power source in FIG. 1.

The internal power source 65 supplies the energy accumulated in the backup capacitor 63 to the control unit 49. The internal power source 65 comprises a PNP transistor 65a whose emitter is connected to the anode electrode of the backup capacitor 63, and an NPN transistor 65b whose collector is connected to the anode electrode of the backup capacitor 63.

The base of the transistor 65a is connected to the cathode of a Zener diode 65c. The anode of the Zener diode 65c is connected to the ground via a resistance 65d. One end of a resistance 65e is connected to the collector of the transistor 65a. The other end of the resistance 65e is connected to the base of the transistor 65b.

The base of the transistor 65b and the other end of the resistance 65e are connected to the cathode of a Zener diode 65f, and the anode of the Zener diode 65f is connected to the ground. The emitter of the transistor 65b is connected to the control unit 49. The transistor 65a is turned on when detecting that charging voltage of the backup capacitor 63 becomes a predetermined value, and turns on the transistor 65b. The transistor 65a can be constituted by a MOS to reduce power consumption. The voltage that turns on/off the transistor 65a may have a hysteresis so as to prevent the transistor 65b that is turned on, from becoming turned off again, by the charging voltage of the back up capacitor 63 changing.

Figure 4:
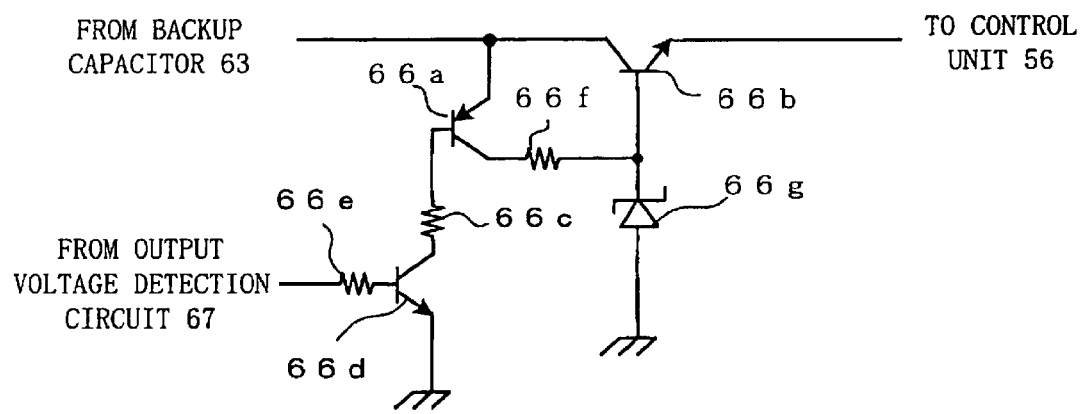
FIG. 4 is a diagram showing s structure example of the internal power source in FIG. 1.

FIG. 4 is a diagram showing a structure example of an internal power source in FIG. 1.

The internal power source 66 comprises a PNP transistor 66a whose emitter is connected to the anode electrode of the backup capacitor 63, and an NPN transistor 66b whose collector is connected to the anode electrode of the backup capacitor 63.

The base of the transistor 66a is connected to the collector of an NPN transistor 66d via a resistance 66c. The resistance 66c controls the base current of the transistor 66a. The emitter of the transistor 66d is connected to the ground. The base of the transistor 66d is connected to the output terminal of the output voltage detection circuit 67. A resistance 66e limits the base current of the transistor 66d.

The collector of the transistor 66a is connected to the base of the transistor 66b via a resistance 66f. The base of the transistor 66b is further connected to the cathode of a Zener diode 66g. The anode of the Zener diode 66g is connected to the ground. The emitter of the transistor 66b is connected to a control unit 56. The output voltage detection circuit 67 is constituted by a comparator (not shown) or the like, etc., and compares the output voltage of the power factor improvement circuit 40-2 with a standard voltage. When the output voltage of the power factor improvement circuit 40-2 becomes a predetermined value, the output voltage detection circuit 67 outputs a signal of a high level (hereinafter referred to as "H"). The output signal is provided to the base of the transistor 66d of the internal power source 66.

Transistors 66a, 66b and 66d in the internal power source 66 can be constituted by a NMOS transistor or a PMOS transistor so as to reduce power consumption. The voltage that turns on/off the transistor 66a may have a hysteresis so as to prevent the transistor 66b that is turned on, from becoming turned off again, by the charging voltage of the back up capacitor 63 changing.

Next, operation of the switching power source apparatus and the starting circuit of the power source apparatus will be described with reference to FIGS. 5 and 6 (A to G).

Figure 5:
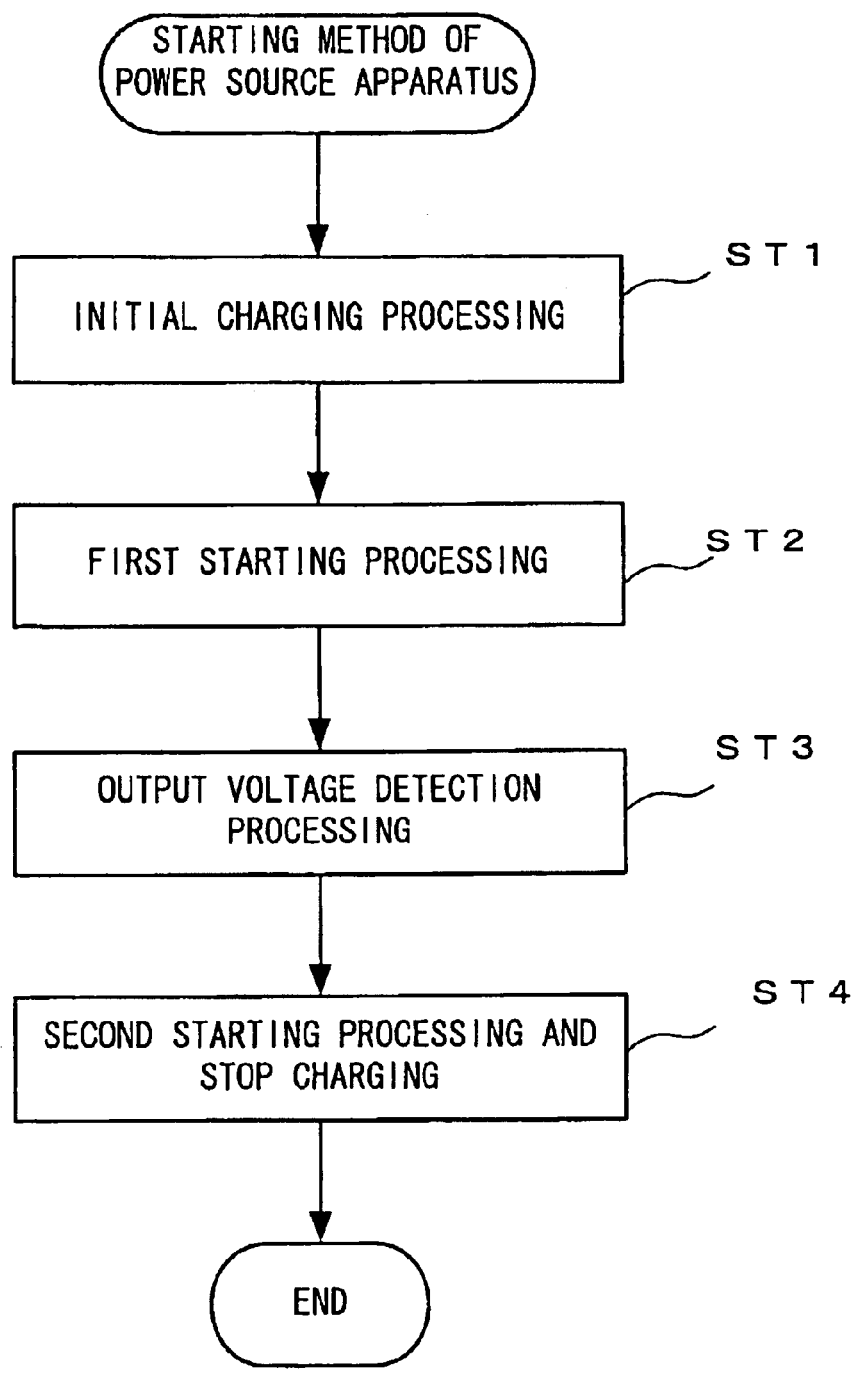
FIG. 5 is a flowchart showing a power source apparatus starting method.
Figure 6:
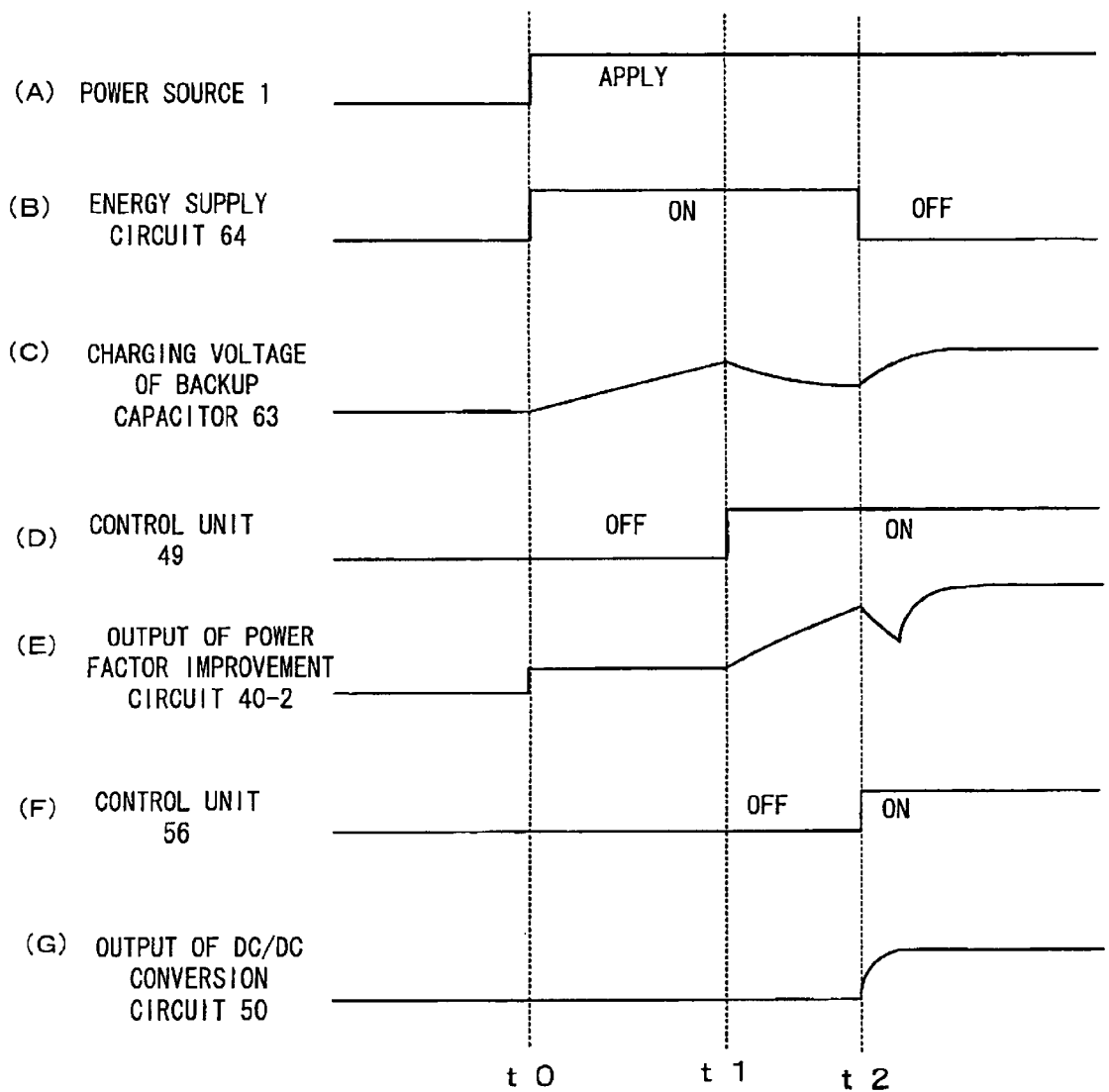
FIGS. 6 (A to G) are timing charts showing operation of the starting circuit in FIG. 1.
Figure 7:
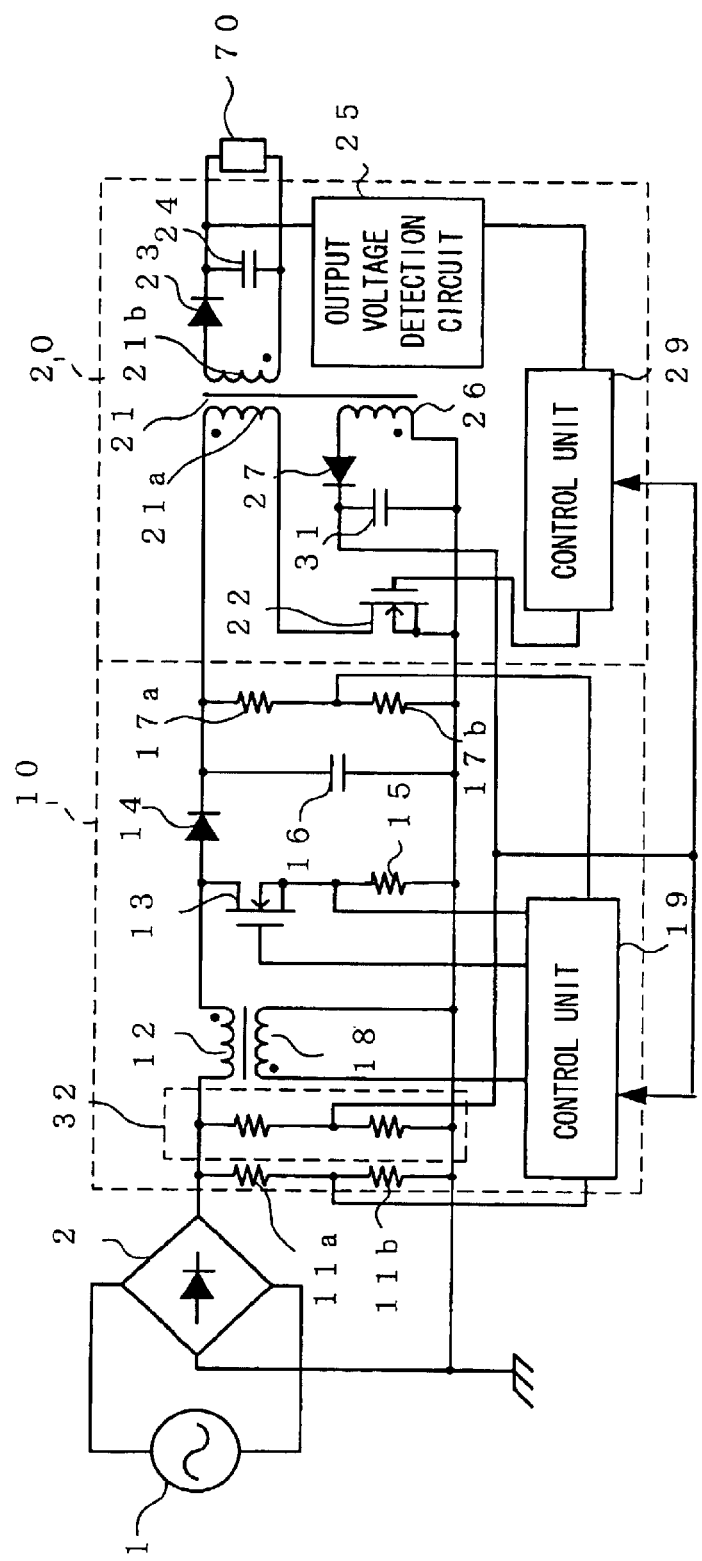
FIG. 7 is a structural diagram showing an outline of a conventional starting circuit and a switching power source apparatus.
Figure 8:
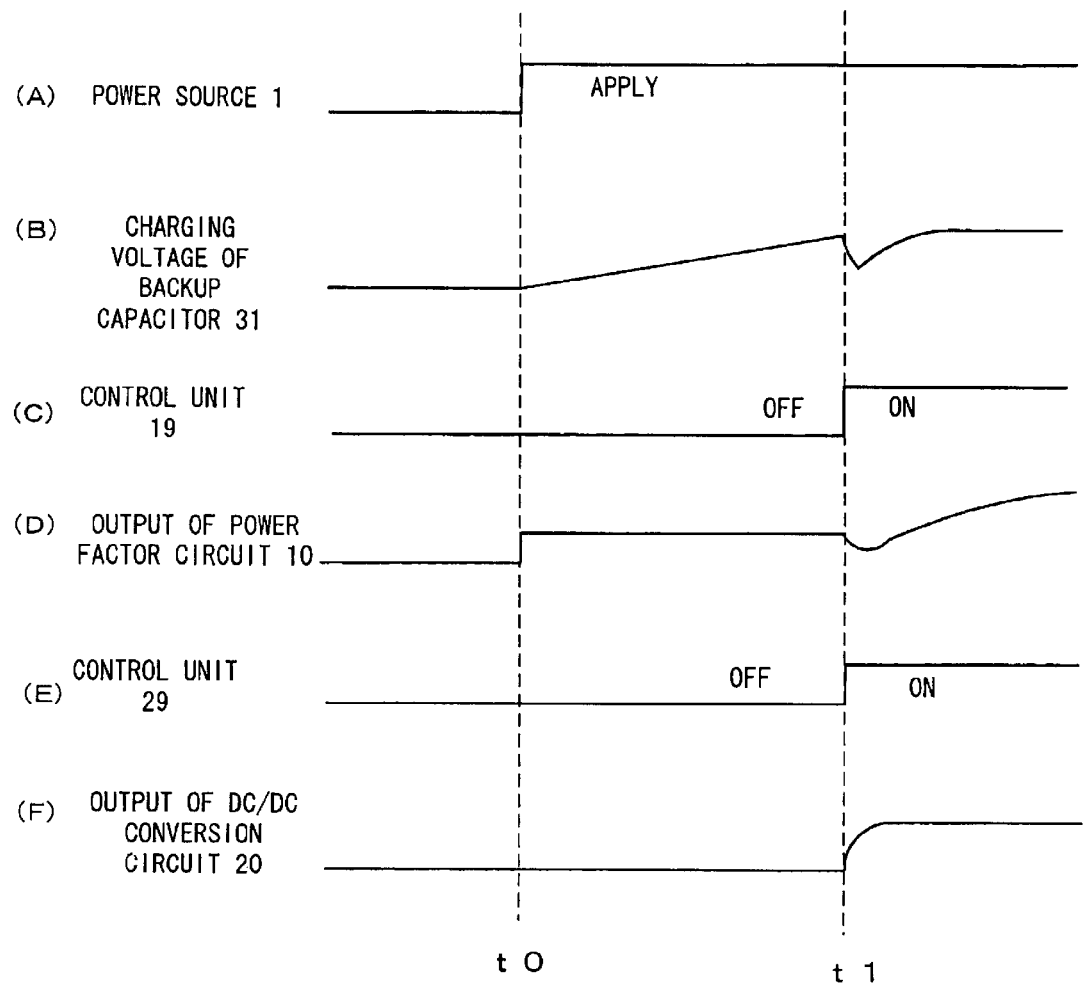
FIGS. 8 (A to F) are timing charts showing the operation of the starting circuit in FIG. 7.

FIG. 5 is a flowchart showing a starting method of the switching power source apparatus. FIGS. 6 (A to G) are time charts describing operation of the power source apparatus starting circuit.

The starting circuit performs Steps ST1 to ST4 shown in FIG. 5, to start the switching power source apparatus, and supply a requested DC voltage to the load 70.

First, in Step ST1, initial charging processing of charging energy to the backup capacitor 63, applying the energy supply circuit 64 is carried out.

Namely, when the AC power source 1 is applied at a time t0, (FIG. 6(A)), a rectifier circuit 40-1 that rectifies the AC voltage generates a rectifier voltage. When the rectifier voltage is input to the power factor improvement circuit 40-2, the diode 44 is turned on, a current passes through the coil 42, and the capacitor 46 is charged.

At this time, the switch 64b in the energy supply circuit 64 is on, (FIG. 6(B)), and energy is charged to the backup capacitor 63 via the constant current 64a. By this charging, charging voltage of the backup capacitor 63 rises with the passage of time (FIG. 6(C)).

When the charging voltage of the backup capacitor 63 rises, and yield point of the Zener diode 65c in the internal power source 65 passes at time t1, a first starting processing of step ST2 is carried out. Namely, by the Zener diode 65c yielding, the transistor 65a is turned on, and raises the base voltage of the transistor 65b. By this, the transistor 65b is turned on, and energy is input to the control unit 49 from the backup capacitor 63. When energy is input to the control unit 49, the control unit 49 is turned on (FIG. 6(D)), power factor improving operation is carried out by controlling the power factor improvement circuit 40-2.

A voltage signal that divided voltage of the rectified voltage, is input to the control unit 49, from the resistances 41a and 41b in the power factor improvement circuit 40-2. A voltage signal that divides the charging voltage of the capacitor 46 is input from the resistances 47a and 47b. The coil 48 that electromagnetically couples with the coil 42, generates a flyback voltage, when energy is radiated from the coil 42. A voltage signal that corresponds to the flyback voltage is input to the control unit 49. The NMOS transistor 43 whose drain is connected to the coil 42, passes the current that flows through the coil 42, when it is on, to the cathode terminal of the rectifier circuit 40-1, and the resistance 45 connected to the source of the NMOS transistor 43 generates a voltage signal that is proportional to the current. These voltage signals are supplied to the control unit 49.

The control unit 49 that received energy from the internal power source 65 generates a control signal, based on each voltage signal supplied from the power factor improvement circuit 40-2, and provides it to the gate of the NMOS transistor 43 to turn on/off the NMOS transistor 43.

By turning the NMOS transistor 43 on, a current passes in the order of, coil 42, NMOS transistor 43, resistance 45, and cathode terminal of the rectifier circuit 40-1, from the anode terminal of the rectifier circuit 40-1, and energy is accumulated in the coil 42. When the NMOS transistor 43 is turned off, the energy accumulated in the coil 42 and the energy output from the rectifier circuit 40-1 is passed through via the diode 44, and the capacitor 46 is charged. NMOS transistor 43 is repeatedly turned on and off. As a result, the charging voltage of the capacitor 46 becomes a predetermined voltage, in which the output voltage of the rectifier circuit 40-1 is raised (FIG. 6(E)). Also, by the NMOS transistor 43 repeatedly being turned on/off, the current that flows through the coil 42 intermittently, is controlled so that it matches with the phase of the rectifier voltage that the rectifier circuit 40-1 generates. Namely, power factor improving operation is carried out.

In the output voltage detection processing in Step ST3, the output voltage detection circuit 67 determines whether the charging voltage of the capacitor 46 has reached a predetermined voltage or not, and output an "H" when the charging voltage reaches the predetermined value t2.

In Step ST3, when the output voltage detection circuit 67 outputs an output signal of the "H", a second starting processing of Step ST4 is carried out by the internal power source 66.

Namely, at the internal power source 66, the output signal "H" of the output voltage detection circuit 67 is input to the base of the transistor 66d via the resistance 66e. By this, the transistor 66d is turned on. When the transistor 66d is turned on, the transistor 66a whose emitter is connected to the backup capacitor 63 is turned on. When the transistor 66a is turned on, the base voltage of the transistor 66b rises, and the transistor 66b is turned on. By the transistor 66b being turned on, energy from the backup capacitor 63 is supplied to the control unit 56 via the transistor 66b.

The output signal of the transistor 66b is supplied to the switch 64b of the energy supply circuit 64. By this, the switch 64b is turned off, and charging to the backup capacitor 63, by the energy supply circuit 64, stops. In this way, by stopping the charging of the backup capacitor 63 by the energy supply circuit 64, energy that flows through the energy supply circuit 64 from the capacitor 46, runs out, and for example, the load 70 becomes a waiting state and gets lighter, unnecessary charging is not carried out, and low power consumption becomes possible.

When energy is input to the control unit 56, the control unit 56 is turned on (FIG. 6(F)), and DC voltage conversion operation is carried out by controlling the DC/DC voltage conversion circuit 50.

Here, a voltage signal that corresponds to charging voltage of the capacitor 54 from the output voltage detection circuit 55 in the DC/DC conversion circuit 50, is input to the control unit 56. The control unit 56 that has energy input from the interior power source 66, provides a control signal based on the voltage signal from the output voltage detection circuit 55, to the gate of the NMOS transistor 52, and turns on/off the NMOS transistor 52 so that the charging voltage of the capacitor 54, i.e., voltage supplied to the load 70 (FIG. 6(G)) becomes a predetermined value.

When the NMOS transistor 52 is turned on, current from the capacitor 46 is passed through to the primary winding 51a of the transformer 51, and energy is accumulated in the primary winding 51a. When the NMOS transistor 52 is turned off, flyback energy that corresponds to the energy in the primary winding 51a, generated in the secondary winding 51b of the transformer 51, and the capacitor 54 is charged via the diode 53. Charging voltage of the capacitor 54 is supplied to the load 70.

When the NMOS transistor 52 is turned off, flyback energy also generates in the auxiliary winding 61 that electromagnetically couples with the primary winding 51a. This flyback energy is supplied to the positive electrode (+) of the backup capacitor 63 via the diode 62, and the backup capacitor 63 is charged. Thereafter, by the flyback energy from the auxiliary winding 61, the backup capacitor 63 is charged, and the switching power source apparatus operates by the charging energy of the backup capacitor 63 being supplied to the control units 49 and 62.

By the embodiment of a power source apparatus starting circuit and a staring method such as above, operation effects such as below can be obtained.

(1) Because the energy supply circuit 64 works and provides energy only to the control unit 49 via the internal power source 65, until the power factor improvement circuit 40-2 operates and generates a predetermined voltage, the capacity of the capacitor 63 can be small, and a certain starting characteristic can be obtained. At the same time, miniaturization and lower cost of a starting circuit, or a switching apparatus that has the starting circuit built in, can be possible.

(2) Because the capacity of the backup capacitor 63 is small, charging speed is fast even with little current. Therefore, it is not necessary to flow more current than necessary, to the energy supply circuit 64, and heat generation can be reduced.

(3) The DC/DC conversion circuit 50 starts, after the output voltage of the power factor improvement circuit 40, whose rising is very slow compared to the DC/DC conversion circuit 50, becomes enough. Therefore, the present invention does not have problems of starting deficiency in which, either one of the power factor improvement circuit 40 and the DC/DC conversion circuit 50 starts, and the other does not start, and the output voltage of the power factor improvement circuit 40 and the DC/DC conversion circuit 50 dropping drastically, by the starting time varying, and can start swiftly and accurately, and keep the capacity of the backup capacitor small.

The present invention is not limited to the above embodiment, and various changes are possible. Below are examples of other possible embodiments.

(a) The AC/DC conversion circuit 40 can be replaced to another AC/DC conversion circuit that does not carry out power factor improving.

(b) The DC/DC conversion circuit 50 can be converted to a power source apparatus of a non-insulated chopper type or a pressor chopper, without an insulation type applying for example, the transformer 51.

(c) The power factor improvement circuit 40-2 and the DC/DC conversion circuit 50 are each switching power source apparatuses that repeatedly turns on/off the NMOS transistor 43 and the NMOS transistor 52. However, even in a case where a power source apparatus is constituted by an AC/DC conversion circuit and a DC/DC conversion circuit that are not switching power source apparatuses, the capacity of the element to be charged for backup can be made smaller, for starting the AC/DC conversion circuit and the DC/DC conversion circuit, by starting only the AC/DC conversion circuit right after the power source is applied, and starting the DC/DC conversion circuit when the AC/DC conversion circuit outputs a predetermined voltage. Therefore, miniaturization and low cost becomes possible.

(d) The backup capacitor 63 does not have to be charged by the voltage charged in the capacitor 46 of the output side of the power factor improvement circuit 40-2. For example, the backup capacitor 63 can be charged by the voltage charged in the input side of the power factor improvement circuit 40-2.

As described above in detail, according to the present invention, it is possible to reduce the capacity of the storage element, and miniaturization and low cost of a starting circuit of a power source apparatus, or a power source having the starting circuit built in, is possible.

This application is based on Japanese Patent Application No. 2002-31691, filed on Feb. 8, 2002, and including specification, claims, drawings and summary. The disclosure of the above Japanese Patent Application is incorporated herein by reference in its entirety.

INDUSTRIAL APPLICABILITY

The present invention can be applied to a device that comprises a power source apparatus.

What is claimed is:

1. A method for starting a power source apparatus that comprises an AC/DC conversion circuit (40) that converts an AC voltage provided by a power source (1) to a first DC voltage while operating, and a DC/DC conversion circuit (50) that converts the first DC voltage that said AC/DC conversion circuit outputs, to a second DC voltage, while operating, by using an element to be charged (63) for backup and an energy supply circuit (64) that supplies the energy that the power source generates to the element to be charged (63), characterized by carrying out:

an initial charging processing that charges by supplying energy that said power source (1) generates to the element to be charged (63), using the energy supply circuit (64) from the time that said power source (1) is applied;

a first starting processing that starts said AC/DC conversion circuit (40) to operate by supplying the energy accumulated in the element to be charged (63) to the AC/DC conversion circuit (40), in a case where it is detected that a predetermined energy is charged to said element to be charged (63);

an output voltage detection processing that detects that said first DC voltage is output, by said AC/DC conversion circuit (40) operating, and a second starting processing that starts said DC/DC conversion circuit (50) to operate by supplying the energy accumulated in said element to be charged (63) to the DC/DC conversion circuit (50), after it is detected that the AC/DC conversion circuit (40) output said first DC voltage.

2. The method for starting a power source apparatus according to claim 1, characterized by further carrying out a stopping charge processing that stops said initial charging processing, after it is detected that said AC/DC conversion circuit (40) output said first DC voltage.

3. The method for starting a power source apparatus according to claim 2, characterized by charging said element to be charged, by supplying a part of the energy that said DC/DC conversion circuit (50) generates to the element to be charged, after said stopping charge processing.

4. The method for starting a power source apparatus according to claim 1, characterized in that said AC/DC conversion circuit (40) comprises:

a rectifier circuit (40-1) that is connected to said power source (1);

a first coil (42) that is connected to said rectifier circuit (40-1);

a first switching element (43) that is connected to said first coil (42), which passes a current to said first coil (42) when it is turned on, and stops the current when it is turned off;

first DC conversion means (44, 46) that transform the energy accumulated in said first coil (42) to said first DC voltage, by said current passing through said first coil (42), and a first control unit (49) that controls on/off of said first switching element (43), and in said first starting processing, said AC/DC conversion circuit (40) is started by supplying the energy charged in said element to be charged (63) to the first control unit (49) and starting the first control unit (49).

5. The method for starting a power source apparatus according to claim 1, characterized in that said DC/DC conversion circuit (50) comprises:

a second coil (51a) that is connected to the output terminal of said AC/DC conversion circuit (40);

a second switching element (52) that is connected to said second coil (51a), which passes a current to the second coil (51a) when it is turned on, and stops the current when it is turned off;

second DC conversion means (51b, 53, 54) that transform the energy accumulated in said second coil (51a) to said second DC voltage, by said current passing through the second coil (51a), and a second control unit (56) that controls on/off of said second switching element (52), and in said second starting processing, said DC/DC conversion circuit (50) is started by supplying the energy charged in said element to be charged (63) to the second control unit (56) and starting the second control unit (56).

6. A starting circuit (60) of a power source apparatus characterized by including an AC/DC conversion circuit (40) that converts an AC voltage provided by a power source (1) to a first DC voltage while operating, and a DC/DC conversion circuit (50) that converts the first DC voltage that said AC/DC conversion circuit outputs, to a second DC voltage, while operating, and comprises:

an element to be charged (63) for backup;

an energy supply circuit (64) that charges said element to be charged (63) by supplying energy that the power source generates, after said power source (1) is applied;

a first internal power source (65) that detects whether a predetermined energy has been charged to said element to be charged, and operates said AC/DC conversion circuit (40) by supplying the energy accumulated in the element to be charged (63) to the AC/DC conversion circuit (40);

an output voltage detection circuit (67) that detects that said AC/DC conversion circuit (40) is operating, and said first DC voltage is output, and a second internal power source (66) that operates said DC/DC conversion circuit (50) by supplying energy accumulated in said element to be charged (63) to the DC/DC conversion circuit (50), after it is detected that said AC/DC conversion circuit (40) is operating, and has output the first DC voltage.

7. The starting circuit (60) of the power source apparatus according to claim 6, characterized by further comprising stopping charge means (64b) for stopping charging to said element to be charged (63) by the energy supply circuit, after it is detected that said AC/DC conversion circuit (40) has output said first DC voltage.

8. The starting circuit (60) of the power source apparatus according to claim 7, characterized by further comprising charging continuation means (61, 62) for charging by supplying a part of energy that said DC/DC conversion circuit (50) generates to the element to be charged (63), after said stopping charge means (64b) stops charging to the element to be charged.

9. The starting circuit (60) of the power source apparatus according to claim 6, characterized in that
said AC/DC conversion circuit (40) comprises:
a rectifier circuit (40-1) that is connected to said power source (1);
a first coil (42) that is connected to said rectifier circuit (40-1);
a first switching element (43) that is connected to said first coil (42), which passes a current to the first coil (42) when it is turned on, and stops the current when it is turned off;
first DC conversion means (44, 46) that transform the energy accumulated in the first coil (42) to said first DC voltage, by said current passing through said first coil (42), and
a first control unit (49) that controls on/off of said first switching element (43), and
said first internal power source (65) starts the AC/DC conversion circuit (40) by supplying the energy accumulated in the element to be charged (63) to the first control unit (49) and starting the first control unit (49).

10. The power source apparatus starting method according to claim 6, characterized in that
said DC/DC conversion circuit (50) comprises:
a second coil (51a) that is connected to the output terminal of said AC/DC conversion circuit (40);
a second switching element (52) that is connected to said second coil (51a), which passes a current to the second coil (51a) when it is turned on, and stops the current when it is turned off;
second DC conversion means (51b, 53, 54) that transform the energy accumulated in the second coil (51a) to said second DC voltage, by said current passing through said second coil (51a), and a second control unit (56) that controls on/off of said second switching element (52), and
in said second internal power source (66), said DC/DC conversion circuit (50) is started by supplying the energy charged in said element to be charged (63) to the second control unit (56) and starting the second control unit (56).

11. The starting circuit (60) of the power source apparatus according to claim 10, characterized by comprising an auxiliary coil (61) that electromagnetically couples with the second coil (51b), and a diode (62) that charges said element to be charged by rectifying the energy that the auxiliary coil (61) generates and supplying the energy to the element to be charged (63).

12. A power source apparatus characterized by comprising:
an AC/DC conversion circuit (40) that converts an AC voltage provided by a power source (1) to a first DC voltage while operating;
a DC/DC conversion circuit (50) that converts the first DC voltage that said AC/DC conversion circuit (40) outputs, to a second DC voltage, while operating;
an element to be charged (63) for backup;
an energy supply circuit (64) that charges said element to be charged (63) by supplying energy that a power source generates, after said power source (1) is applied;
a first internal power source (65) that detects whether a predetermined energy has been charged to said element to be charged (63), and operates said AC/DC conversion circuit (40) by supplying the energy accumulated in the element to be charged (63) to the AC/DC conversion circuit (40);
an output voltage detection circuit (67) that detects that said AC/DC conversion circuit (40) is operating, and said first DC voltage is output, and
a second internal power source (66) that operates said DC/DC conversion circuit (50) by supplying energy accumulated in said element to be charged (63) to the DC/DC conversion circuit (50), after it is detected that said AC/DC conversion circuit (40) has output the first DC voltage.

13. The power source apparatus according to claim 12, characterized by further comprising stopping charge means (64b) for stopping charging to said element to be charged (63) by said energy supply circuit (64), after it is detected that said AC/DC conversion circuit (40) output the first DC voltage.

14. The power source apparatus according to claim 13, characterized by further comprising charging continuation means (61, 62) for charging by supplying a part of energy that said DC/DC conversion circuit (50) generates to said element to be charged (63), after the stopping charge means (64b) stops charging to the element to be charged (63).

15. The power source apparatus according to claim 12, characterized in that
said AC/DC conversion circuit (40) comprises:
a rectifier circuit (40-1) that is connected to said power source;
a first coil (42) that is connected to said rectifier circuit (40-1);
a first switching element (43) that is connected to said first coil (42), which passes a current to the first coil (42) when it is turned on, and stops the current when it is turned off;
first DC conversion means (44, 46) that transform the energy accumulated in the first coil (42) to said first DC voltage, by said current passing through said first coil (42), and a first control unit (49) that controls on/off of said first switching element (43), and said first internal power source (65) starts said AC/DC conversion circuit (40) by supplying the energy accumulated in said element to be charged (63) to the first control unit (49) and starting the first control unit (49).

16. The power source apparatus according to claim 12, characterized in that said DC/DC conversion circuit (50) comprises:

a second coil (51*a*) that is connected to the output terminal of said AC/DC conversion circuit (40);

a second switching element (52) that is connected to said second coil (51*a*), which passes a current to the second coil (51*a*) when it is turned on, and stops the current when it is turned off;

second DC conversion means (51*b*, 53, 54) that transform the energy accumulated in the second coil (51*a*) to said second DC voltage, by said current passing through said second coil (51*a*), and a second control unit (56) that controls on/off of said second switching element (52), and in said second internal power source (66), said DC/DC conversion circuit (50) is started by supplying the energy charged in said element to be charged (63) to the second control unit (56) and starting the second control unit (56).

17. The power source apparatus according to claim 16, characterized by comprising an auxiliary coil (61) that electromagnetically couples with said second coil (51*a*), and a diode (62) that charges said element to be charged by rectifying the energy that the auxiliary coil (61) generates and supplying the energy to the element to be charged (63).

* * * * *